United States Patent [19]

Takadera et al.

[11] Patent Number: 4,621,831
[45] Date of Patent: Nov. 11, 1986

[54] STABILIZER FOR MOTOR VEHICLE

[75] Inventors: Ichiro Takadera, Tokyo; Shigeru Kuroda, Yokohama, both of Japan

[73] Assignee: NHK Spring Co., Ltd., Yokohama, Japan

[21] Appl. No.: 769,001

[22] Filed: Aug. 23, 1985

[30] Foreign Application Priority Data

Sep. 6, 1984 [JP] Japan .................... 59-186691
Sep. 26, 1984 [JP] Japan .................... 59-201346
Dec. 14, 1984 [JP] Japan .................... 59-264196

[51] Int. Cl.⁴ .............................. B60G 19/00
[52] U.S. Cl. .................... 280/689; 280/700; 280/723; 267/57
[58] Field of Search ........... 280/689, 695, 700, 721, 280/723; 267/57

[56] References Cited

U.S. PATENT DOCUMENTS

| 3,197,233 | 7/1965 | Van Winsen et al. | 280/112 A |
| 3,885,775 | 5/1975 | Bolduc | 267/11 |
| 3,992,036 | 11/1976 | Allison | 280/695 |
| 4,010,941 | 3/1977 | Kirkland | 267/57 |
| 4,022,494 | 5/1977 | Allison | 280/723 |
| 4,033,605 | 7/1977 | Smith et al. | 280/664 |
| 4,066,278 | 1/1978 | Takagi | 280/710 |
| 4,168,075 | 9/1979 | Matschinsky | 280/689 |
| 4,369,988 | 1/1983 | Takagi | 280/689 |

FOREIGN PATENT DOCUMENTS

| 131024 | 11/1976 | Japan. |
| 27121 | 3/1977 | Japan. |
| 17210 | 6/1979 | Japan. |
| 4908 | 1/1981 | Japan. |
| 66009 | 4/1983 | Japan. |
| 2006131 | 5/1979 | United Kingdom ............ 280/689 |

Primary Examiner—John J. Love
Attorney, Agent, or Firm—Frishauf, Holtz, Goodman & Woodward

[57] ABSTRACT

A first member is attached to the distal end of one of two arm sections of a stabilizer. The first member has a cylindrical bore in which a columnar second member is inserted. A pair of coil springs are disposed between the inner peripheral surface of the bore of the first member and the outer peripheral surface of the second member. The coil springs are wound around the second member. The inside diameter of the coil springs in a non-loaded state is smaller than the outside diameter of the second member. The coil springs have a fixed end and a free end each. The respective fixed ends of the coil springs are fixed to the first member, while the free ends are fitted with an operating member. The operating member is driven by drive including a solenoid. The drive applies a force to the operating member in a direction such that the diameter of each coil spring is increased.

11 Claims, 10 Drawing Figures

FIG. 5
FIG. 6
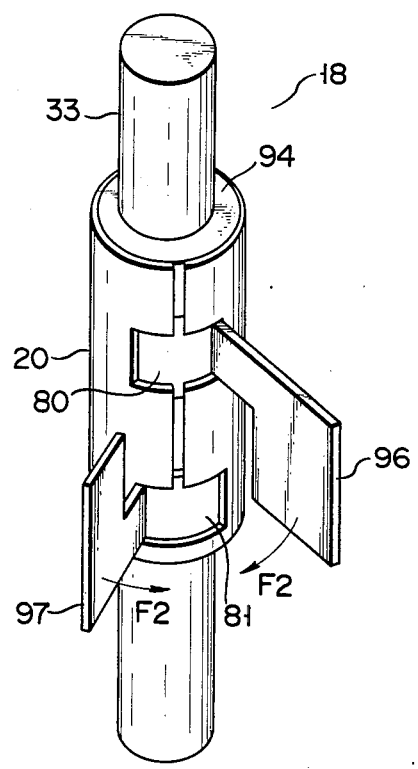
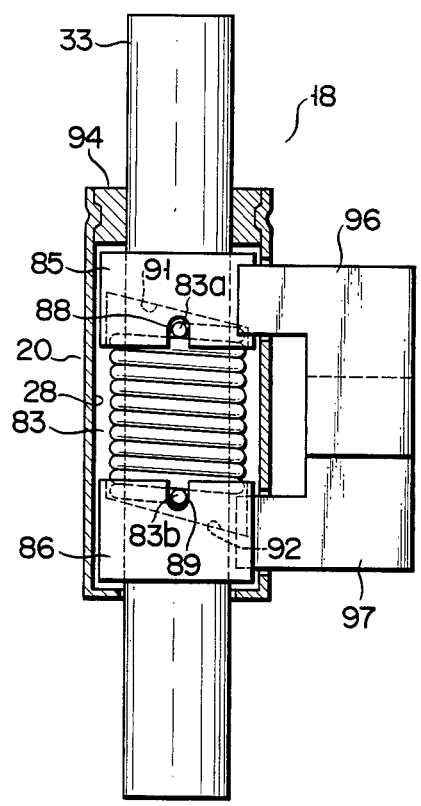

STABILIZER FOR MOTOR VEHICLE

BACKGROUND OF THE INVENTION

The present invention relates to stabilizers for motor vehicles adapted to be attached to the suspension system of a motor vehicle.

Stabilizers, which generally are disposed between the body and axle of a motor vehicle, serve to restrain the vehicle body from rolling from side to side. A conventional stabilizer comprises a rod-shaped torsion section extending in the transverse direction of the motor vehicle and a pair of arm sections continuous with both ends of the torsion section. The arm sections extend in the longitudinal direction of the vehicle.

Prior art stabilizers are effective means for stabilizing the posture of the body of a motor vehicle during cornering. In a motor vehicle furnished with a stabilizer, however, an up-and-down quake of one wheel is transmitted to its opposite wheel while the vehicle is running on the rough ground. Thus, the treading stability of the wheels gets all the worse for the use of the stabilizer.

When running on the rough ground, therefore, motor vehicles should have their stabilizer prevented from fulfilling its function.

Once attached to a motor vehicle, however, conventional stabilizers would not be able to neglect their function. Thus, motor vehicles with a stabilizer lack driving stability on rough roads.

SUMMARY OF THE INVENTION

The object of the present invention is to provide a stabilizer for a motor vehicle capable of alternatively fulfilling or neglecting its function depending upon the ground condition.

According to the present invention, there is provided a stabilizer for a motor vehicle which comprises a rod-shaped torsion section extending in the transverse direction of a motor vehicle, a pair of arm sections continuous with both ends of the torsion section and extending in the longitudinal direction of the motor vehicle, a first member attached to the torsion section or at least one of the arm sections and formed with an axially penetrating cylindrical bore, a columnar second member inserted in the bore of the first member, at least one coil spring disposed between the inner peripheral surface of the bore of the first member and the outer peripheral surface of the second member and wound around the second member, at least one end of the coil spring being a free end, an operating member connected to the free end of the coil spring, at least a part of the operating member being located outside the first member, and drive means coupled to the operating member and adapted to apply a force in a direction such that the diameter of the coil spring is increased or reduced.

BRIEF DESCRIPTION OF THE DRAWINGS

FIG. 5 is a partial perspective view of a stabilizer according to another embodiment of the invention;

FIG. 6 is a partial sectional view of the stabilizer shown in FIG. 5;

DETAILED DESCRIPTION OF THE PREFERRED EMBODIMENTS

Figure 1:
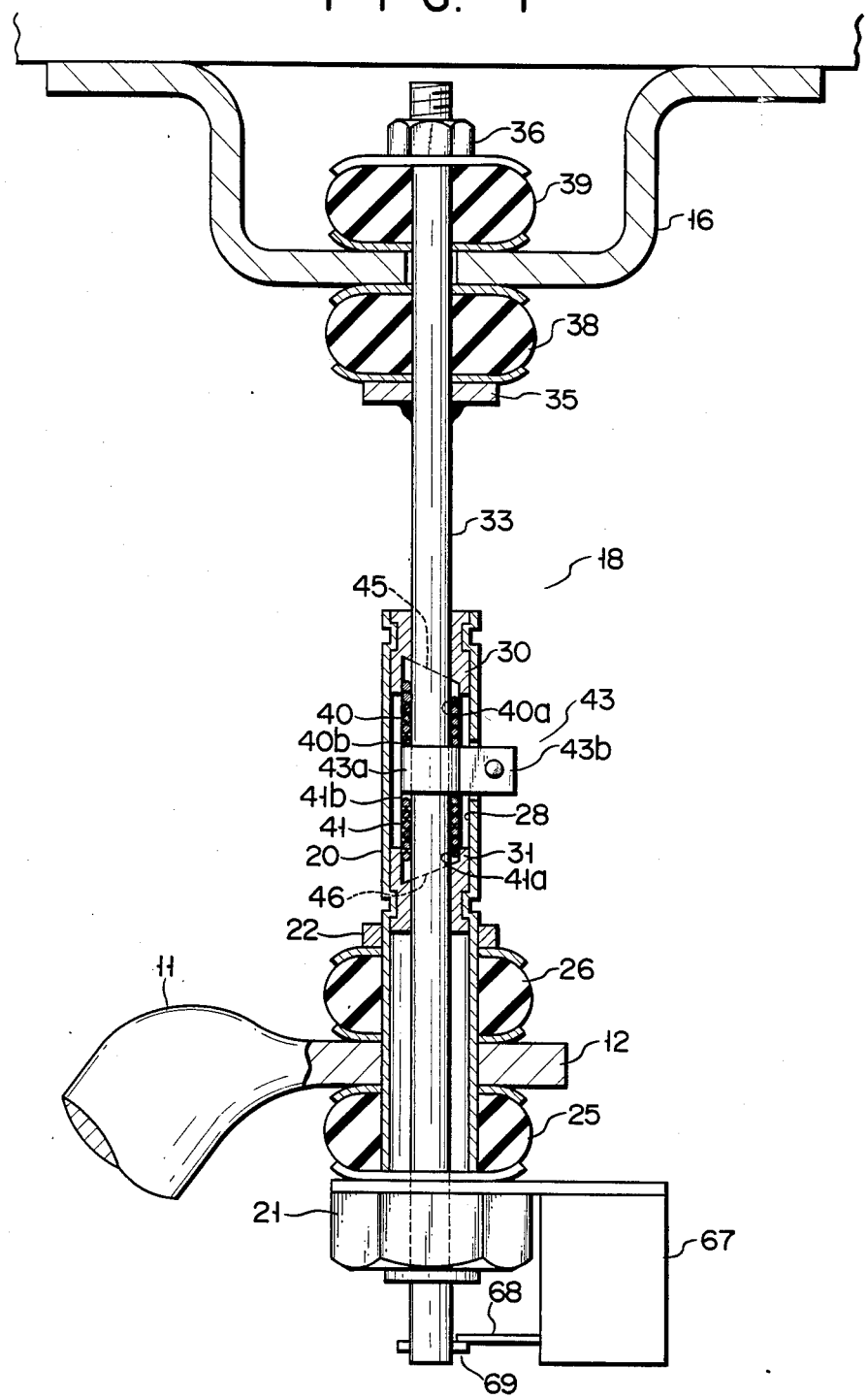
FIG. 1 is a sectional view of an end portion of a stabilizer according to one embodiment of the present invention.
Figure 2:
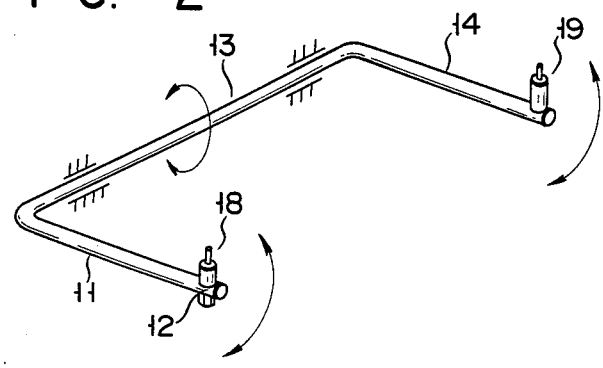
FIG. 2 is a general perspective view of the stabilizer shown in FIG. 1.

In a stabilizer shown in FIG. 1, an arm section 11 has a flat distal end 12. As shown in FIG. 2, the arm section 11 extends from one end of a rodshaped torsion section 13. Another arm section 14 is provided at the other end of the torsion section 13.

The torsion section 13 is coupled to an axle housing (not shown). The torsion section 13 extends in the transverse direction of a motor vehicle. The arm sections 11 and 14 are coupled to the body (not shown) of the motor vehicle. Alternatively, the torsion section 13 may be coupled to the vehicle body. In this case, the arm sections 11 and 14 should be connected to the axle housing. The arm sections 11 and 14 extend in the longitudinal direction of the motor vehicle.

A coupling device 18 is disposed between the distal end 12 of the one arm section 11 and a bracket 16 for supporting the distal end 12. The bracket 16 is attached to the vehicle body. The distal end of the other arm section 14 is coupled to the vehicle body by a rod 19. Alternatively, the coupling device 18 may be attached to the distal end of the other arm section 14.

The coupling device 18 will now be described in detail. A first member 20 is attached to the distal end 12 of the arm section 11 by means of a nut 21 and a collar 22. Rubber mounts 25 and 26 are interposed between the distal end 12 and the nut 21 and between the distal end 12 and the collar 22, respectively.

A cylindrical bore 28 is formed in the first member 20, axially penetrating the same. A pair of supporting blocks 30 and 31 are arranged inside the first member 20. The supporting blocks 30 and 31 are spaced in the axial direction of the first member 20.

A second member 33 is passed through the bore 28. The second member 33, which is columnar in shape, penetrates the supporting blocks 30 and 31 and can move in the axial direction of the first member 20.

The upper end of the second member 33 is attached to the bracket 16 by means of a collar 35 and a nut 36. Rubber mounts 38 and 39 are interposed between the bracket 16 and the collar 35 and between the bracket 16 and the nut 36, respectively.

A pair of coil springs 40 and 41 are disposed between the inner peripheral surface of the bore 28 of the first member 20 and the outer peripheral surface of the second member 33. These coil springs 40 and 41 are spaced in the axial direction of the second member 33.

The two coil springs 40 and 41 have their respective fixed ends 40a and 41a and free ends 40b and 41b. The fixed ends 40a and 41a of the coil springs 40 and 41 are fixed to the supporting blocks 30 and 31, respectively.

The inside diameter of the coil springs 40 and 41 in a non-loaded state is smaller than the outside diameter of the second member 33. Therefore, the coil springs 40 and 41 naturally coil around the second member 33.

An operating member 43 is provided between the two coil springs 40 and 41. The respective free ends 40b and 41b of the coil springs 40 and 41 are connected to one end 43a of the operating member 43. The one end 43a of the operating member 43 is rotatable around the second member 33. Also, the second member 33 can move relative to the operating member 43 in the axial direction of the operating member 43.

The other end 43b of the operating member 43 is located outside the first member 20. When the operating member 43 is rotated in the direction of arrow F1 of FIG. 3, the coil springs 40 and 41 are extended in diameter.

Slanting surfaces 45 and 46 are formed, respectively, at those portions of the supporting blocks 30 and 31 which face the respective end faces of the coil springs 40 and 41. The angle of inclination of the slanting surfaces 45 and 46 is greater than the pitch angle of the coil springs 40 and 41.

Figure 3:
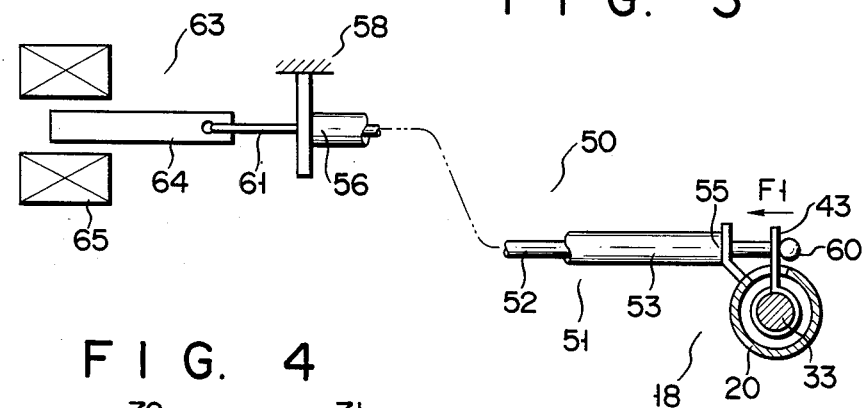
FIG. 3 is a schematic view of drive means used in the stabilizer shown in FIG. 1.

FIG. 3 shows an arrangement of drive means 50. A cable 51 is an example of a power transmitting member. The cable 51 consists of a conductor 52 and an outer tube 53. One end 55 of the outer tube 53 is fixed to the first member 20, and its other end 56 to a portion 58 of the vehicle body.

One end 60 of the conductor 52 is coupled to the operating member 43, and its other end 61 to a movable core 64 of a solenoid 63. The movable core 64 is magnetically moved to the left of FIG. 3 to pull the conductor 52 when a coil 65 is energized.

Figure 4:
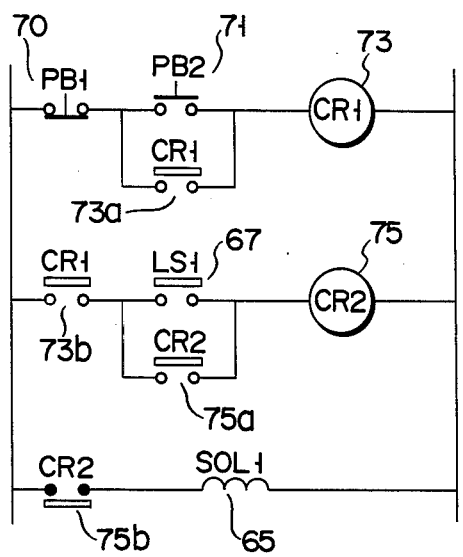
FIG. 4 is a circuit diagram showing an electric circuit used in the drive means shown in FIG. 3.

The coil 65 constitutes part of an electric circuit shown in FIG. 4. This electric circuit includes a sensor 67. As shown in FIG. 1, the sensor 67 is attached to the first member 20.

The sensor 67 detects the position of the second member 33 relative to the first member 20. For example, the sensor 67 and the second member 33 are provided with a lever 68 and a pin 69, respectively. The lever 68 comes into contact with the pin 69 when the distance from the distal end 12 of the arm section 11 to the bracket 16 attains a predetermined length. When the lever 68 touches the pin 69, the sensor 67 is actuated to deliver an output signal for deenergizing the coil 65. The position where the lever 68 is in contact with the pin 69 will hereinafter be referred to as a neutral position of the stabilizer.

First and second switches 70 and 71 shown in FIG. 4 are provided in the cab of the motor vehicle. A first relay 73 is provided with normally-open contacts 73a and 73b, and a second relay 75 with a normally-open contact 75a and a normally-closed contact 75b.

While the conductor 52 of the cable 51 is not being pulled, in the stabilizer of the above described construction, the coil springs 40 and 41 are closely in contact with the second member 33, urged by their own resiliency. If the second member 33 is subjected to an upward force as in FIG. 1, the end face of the coil spring 40 is strongly pressed against the one slanting surface 45, so that the coil spring 40 is warped. As a result, the coil spring 40 is brought more closely into contact with the second member 33. Thus, the second member 33 is fixed to the first member 20.

If the second member 33 is subjected to a downward force, on the other hand, the end face of the coil spring 41 is strongly pressed against the other slanting surface 46, so that the coil spring 41 is warped. As a result, the coil spring 41 is brought more closely into contact with the second member 33. Thus, the second member 33 is fixed to the first member 20.

While the first and second members 20 and 33 are prevented from moving relative to each other in this manner, the arm section 11 is fixed to the bracket 16 by means of the second member 33. As in the case of a conventional stabilizer, therefore, the reaction force of the arm section 11 can be transmitted to the bracket 16. In other words, the stabilizer can fulfill its function.

When the solenoid 63 is actuated so that the conductor 52 is pulled by the movable core 64, the coil springs 40 and 41 are twisted so as to be extended diametrically. Thus, the coil springs 40 and 41 and the second member 33 can move relative to each other in the axial direction. Namely, the arm section 11 can freely move up and down with respect to the bracket 16. As a result, the stabilizer ceases to fulfill its function.

To recover the function of the stabilizer, the second switch 71 is pushed and rendered conductive. Thereupon, the first relay 73 is actuated to close the contacts 73a and 73b. When the contact of the sensor 67 is closed in this state, the second relay 75 is actuated to close the contact 75a. At the same time, the contact 75b is opened. As a result, the coil 65 is deenergized to release the cable 50 from the tractive force, so that the coil springs 40 and 41 can be brought again into close contact with the second member 33. Thus, the first and second members 20 and 33 are fixed to each other, and the stabilizer can enjoy its primary function again.

The function of the stabilizer can be removed by switching off the first switch 70 to deenergize the relays 73 and 75.

The cable 50 may be pulled by means of a hand lever instead of the solenoid 63. If the motor vehicle is furnished with a sensor for sensing the roughness of the ground, the stabilizer's function may be removed by automatically switching off the first switch 70 in response to a signal delivered from the sensor when the vehicle runs on a rough road.

Figure 7:
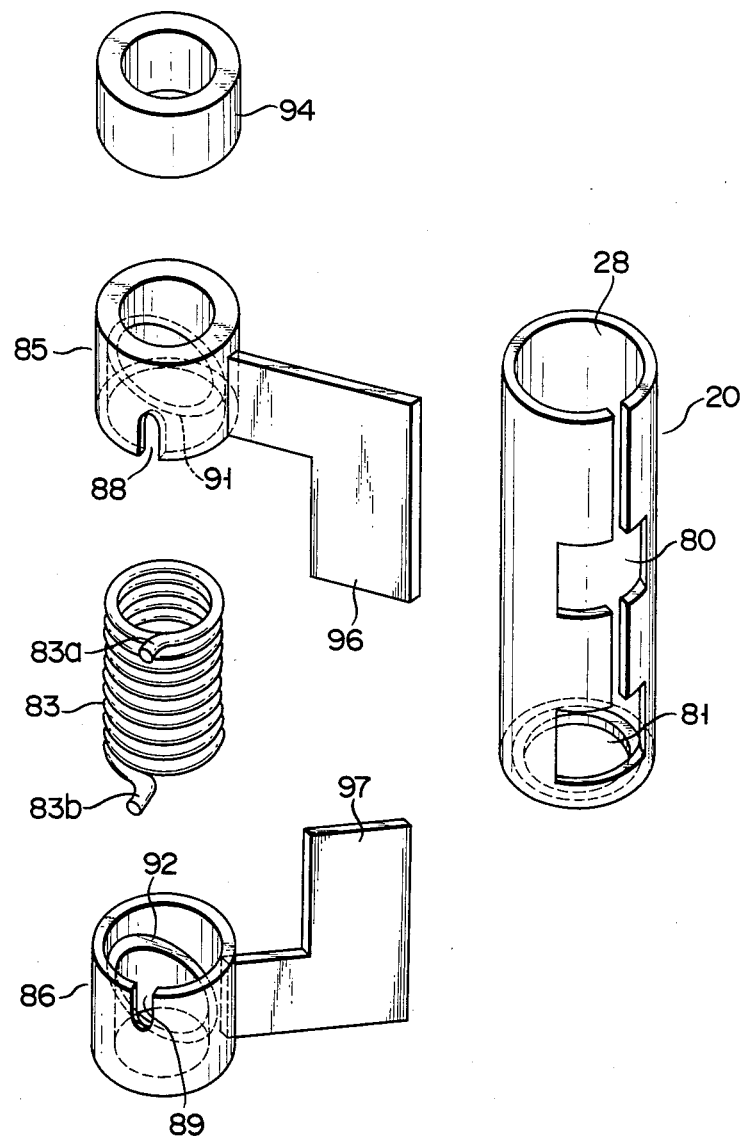
FIG. 7 is a partial exploded perspective view of the stabilizer shown in FIG. 5.

Referring now to FIGS. 5 to 7, another embodiment of the present invention will be described.

As in the first embodiment shown in FIG. 1, a first member 20 is attached to a distal end 12 of an arm section 11 of the stabilizer. A pair of apertures 80 and 81 are formed in the side wall of the first member 20. A second member 33 is passed through the first member 20 so as to be movable in the axial direction.

A single coil spring 83 is disposed between the inner peripheral surface of a bore 28 of the first member 20 and the outer peripheral surface of the second member 33. The inside diameter of the coil spring 83 in a nonloaded state is smaller than the outside diameter of the second member 33. Both ends 83a and 83b of the coil spring 83 are free ends.

A pair of ring members 85 and 86 are arranged inside the first member 20, located on either end side of the coil spring 83. The second member 33 is passed through the ring members 85 and 86 for axial movement and rotation.

Recesses 88 and 89 are formed in the ring members 85 and 86, respectively. The free ends 83a and 83b of the coil spring 83 are fitted in the recesses 88 and 89, respectively.

Slanting surfaces 91 and 92 are formed, respectively, at those portions of the ring members 85 and 86 which face the two end faces of the coil spring 83. The angle of inclination of the slanting surfaces 91 and 92 is greater than the pitch angle of the coil spring 83. A lid 94 is provided outside the one ring member 85.

The ring members 85 and 86 are provided with operating members 96 and 97, respectively. The operating members 96 and 97 project outwardly through the apertures 80 and 81, respectively. Drive means 50 similar to the one used in the embodiment shown in FIG. 3 is coupled to the operating members 96 and 97.

When the operating members 96 and 97 are in a free state, in the stabilizer of this second embodiment constructed in this manner, the spring 83 is closely in contact with the second member 33. Thus, the first and second members 20 and 33 can be fixed to each other, and the stabilizer can fulfill its function.

When the operating members 96 and 97 are moved in the direction indicated by arrow F2 in FIG. 5, the ring members 85 and 86 rotate in a direction such that the inside diameter of the coil spring 83 is extended. As a result, the second member 33 can move axially, that is, the stabilizer loses its function.

Since the coil spring 83 has the two free ends 83a and 83b, the diameter of the coil spring 83 can be extended if at least one of the ring members is rotated in the direction of arrow F2.

Figure 8:
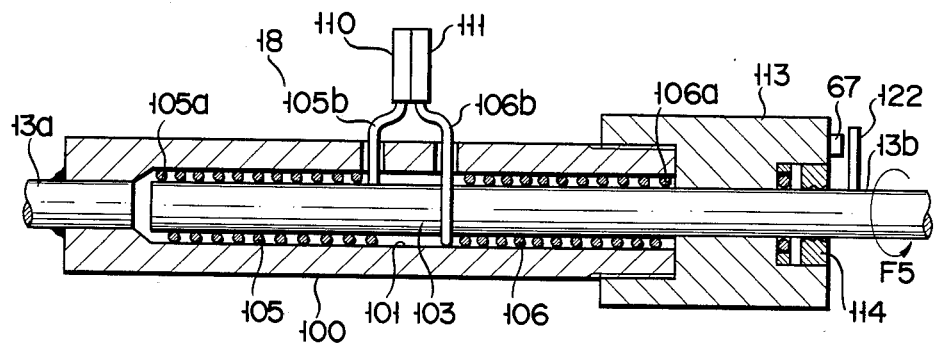
FIG. 8 is a partial sectional view of a stabilizer according to a further embodiment of the invention.
Figure 9:
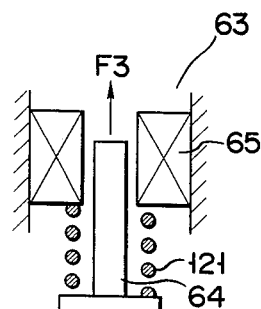
FIG. 9 is a general perspective view of the stabilizer shown in FIG. 8.
Figure 10:
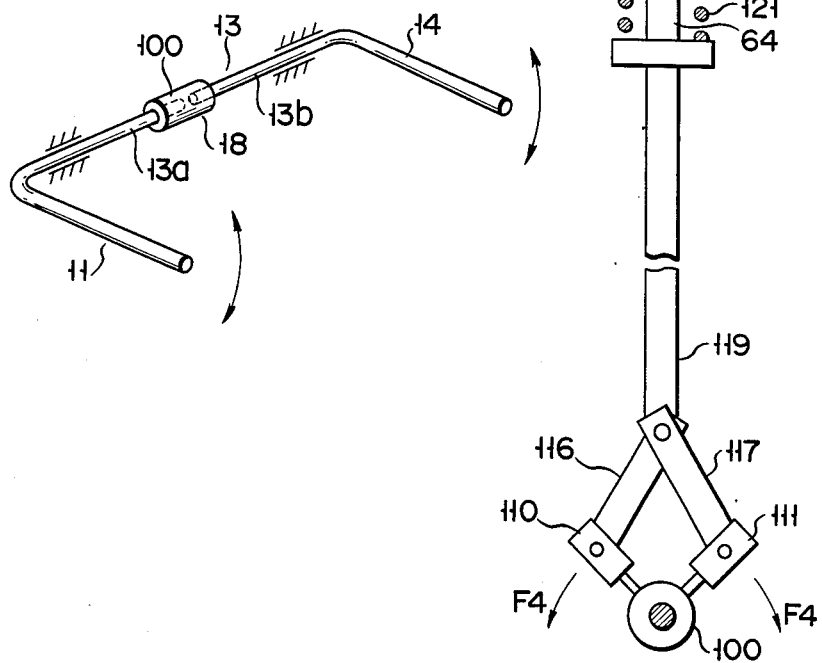
FIG. 10 is a schematic view of drive means used in the stabilizer shown in FIG. 8.

FIGS. 8 to 10 shows a further embodiment of the present invention.

A torsion section 13 of this embodiment is longitudinally divided at the middle portion thereof, that is, it consists of first and second torsion portions 13a and 13b.

A first member 100 is attached to the first torsion portion 13a. A cylindrical bore 101 is formed in the first member 100, axially penetrating the same.

A columnar second member 103 is provided at the end of the second torsion portion 13b. The second member 103 is rotatably inserted in the bore 101.

A pair of coil springs 105 and 106 are disposed between the inner peripheral surface of the bore 101 and the outer peripheral surface of the second member 103. The inside diameter of the coil springs 105 and 106 in a non-loaded state is a little greater than the outside diameter of the second member 103.

The coil springs 105 and 106 have their respective fixed ends 105a and 106a and free ends 105b and 106b. The fixed ends 105a and 106a are fixed to the first member 100, while the free ends 105b and 106b are fitted with operating members 110 and 111, respectively. A seal 114 is disposed inside a cap 113.

FIG. 10 shows drive means 50 for driving the operating members 110 and 111. Links 116 and 117 are coupled to the operating members 110 and 111, respectively. A rod-shaped power transmitting member 119 is connected to the links 116 and 117.

The other end of the power transmitting member 119 is connected to a movable core 64 of a solenoid 63. The movable core 64 is magnetically moved in the direction indicated by arrow F3 to pull the power transmitting member 119 when a coil 65 is energized. When the coil 65 is deenergized, the power transmitting member 119 is pushed back by the resiliency of a spring 121.

The coil 65 is controlled by the electric circuit shown in FIG. 4. As shown in FIG. 8, a sensor 67 is attached to the cap 113, while an object 122 to be detected is mounted on the second member 103. The object 122 is detected by the sensor 67 when the rotational positions of the first and second torsion portions 13a and 13b are neutral.

In the stabilizer of the construction described above, the power transmitting member 119 is pulled when the coil 65 is energized. As a result, the coil springs 105 and 106 are moved so as to be extended diametrically, so that the first and second members 100 and 103 are allowed to rotate relatively. Namely, the first and second torsion portions 13a and 13b are allowed to rotate on their axes. Thus, the stabilizer loses its function.

When the coil 65 is deenergized, the operating members 110 and 111 move in the direction indicated by arrow F4 in FIG. 10. In this state, if the second member 103 is subjected to a rotatory force in the direction of arrow F5 of FIG. 8, the one coil spring 105 is caused to wind more tightly around the second member 103 by frictional force. As a result, the second member 103 is prevented from rotating. If the second member 103 is subjected to a rotatory force in the opposite direction, on the other hand, the other coil spring 106 is caused to wind more tightly around the second member 103 by frictional force. In consequence, the second member 103 is prevented from rotating. If the second member 103 is kept from rotating in this manner, the first and second torsion portions 13a and 13b will never be able to rotate relative to each other. Thus, the stabilizer is allowed to fulfill its function.

What is claimed is:

1. A stabilizer for a motor vehicle comprising:
    a rod-shaped torsion section extending in the transverse direction of a motor vehicle;
    a pair of arm sections continuous with both ends of the torsion section and extending in the longitudinal direction of the motor vehicle;
    a first member attached to the torsion section or at least one of the arm sections and formed with an axially penetrating cylindrical bore;
    a columnar second member inserted in the bore of the first member;
    at least one coil spring disposed between the inner peripheral surface of the bore of the first member and the outer peripheral surface of the second member and wound around the second member, at least one end of said coil spring being a free end;
    an operating member connected to the free end of the coil spring, at least a part of said operating member being located outside the first member; and
    drive means coupled to the operating member and adapted to apply a force in a direction such that the diameter of the coil spring is increased or reduced.

2. The stabilizer for a motor vehicle according to claim 1, wherein said first member is attached to the distal end of the arm section of the stabilizer, said second member is inserted in the bore of the first member so as to be movable in the axial direction of the first member, a pair of said coil springs are disposed between the inner peripheral surface of the bore of the first member and the outer peripheral surface of the second member, each said coil spring having a fixed end and a free end, the respective fixed ends of said two coil springs are fixed to the first member, and said operating member is attached to the respective free ends of the coil springs.

3. The stabilizer for a motor vehicle according to claim 2, wherein the inside diameter of each said coil spring in a non-loaded state is smaller than the outside diameter of the second member.

4. The stabilizer for a motor vehicle according to claim 2, wherein said first member is provided with a pair of supporting blocks arranged individually at the respective fixed end sides of the pair of coil springs, and slanting surfaces are formed at those portions of the supporting blocks which face the end faces of the coil springs, said slanting surfaces having an angle of inclination greater than the pitch angle of the coil springs.

5. The stabilizer for a motor vehicle according to claim 1, wherein said first member is attached to the distal end of the arm section of the stabilizer, said second member is inserted in the bore of the first member so as to be movable in the axial direction of the first member, said coil spring and a pair of ring members located on either end face side of the coil spring are disposed between the inner peripheral surface of the bore of the first member and the outer peripheral surface of the second member, both ends of said coil spring being free ends connected individually to the ring members, and said operating member is attached to the ring members.

6. The stabilizer for a motor vehicle according to claim 5, wherein the inside diameter of said coil spring in a non-loaded state is smaller than the outside diameter of the second member.

7. The stabilizer for a motor vehicle according to claim 5, wherein slanting surfaces are formed at those portions of said ring members which face the end faces of the coil springs, said slanting surfaces having an angle of inclination greater than the pitch angle of the coil springs.

8. The stabilizer for a motor vehicle according to claim 1, wherein said torsion section is longitudinally divided at its middle portion into first and second torsion portions, said first member is fixed to the end of the first torsion portion, said second member is formed at the end of the second torsion portion and inserted in the bore of the first member, a pair of said coil springs are disposed between the inner peripheral surface of the bore of the first member and the outer peripheral surface of the second member, each said coil spring having a fixed end and a free end, each said fixed end is fixed to the first member, and said operating member is attached to each said free end.

9. The stabilizer for a motor vehicle according to claim 8, wherein the inside diameter of each said coil spring in a non-loaded state is greater than the outside diameter of the second member.

10. The stabilizer for a motor vehicle according to claim 1, wherein said drive means includes a power transmitting member coupled to the operating member and a solenoid for exerting a force to push or pull the power transmitting member.

11. The stabilizer for a motor vehicle according to claim 10, further comprising a sensor for detecting the position of the second member relative to the first member, said sensor being adapted to deliver a control signal for actuating the solenoid when the first and second members are located in predetermined relative positions.

* * * * *